United States Patent
Lamers

(12) 
(10) Patent No.: US 6,360,136 B1
(45) Date of Patent: Mar. 19, 2002

(54) METHOD AND DEVICE FOR DISTINGUISHING AND AUTOMATICALLY IDENTIFYING AND CLASSIFYING TOOLS

(75) Inventor: Norbert Lamers, Moers (DE)

(73) Assignee: Wendt GmbH, Meerbusch (DE)

( * ) Notice: Subject to any disclaimer, the term of this patent is extended or adjusted under 35 U.S.C. 154(b) by 0 days.

(21) Appl. No.: 09/084,676

(22) Filed: May 22, 1998

(30) Foreign Application Priority Data

May 27, 1997 (DE) .......................... 197 22 121

(51) Int. Cl.[7] .................... G06F 17/00; G06F 7/00; G07F 7/00; B07C 7/00
(52) U.S. Cl. ................ 700/225; 700/173; 700/175; 700/178; 700/179; 700/243; 483/8; 483/9
(58) Field of Search ............... 700/225, 173, 700/175, 243, 179, 178; 483/8, 9

(56) References Cited

U.S. PATENT DOCUMENTS

| | | | |
|---|---|---|---|
| 1,984,839 A | | 12/1934 | Murray .................... 40/2.2 |
| 3,366,248 A | * | 1/1968 | Sedwick et al. ............... 483/9 |
| 3,760,489 A | * | 9/1973 | Griffith ..................... 483/9 |
| 3,823,466 A | * | 7/1974 | Jerue ....................... 483/8 |
| 4,742,470 A | * | 5/1988 | Juengel ..................... 700/175 |
| 4,820,962 A | * | 4/1989 | Millauer .................... 318/602 |
| 4,900,252 A | * | 2/1990 | Liefke et al. ................ 433/27 |
| 5,815,400 A | * | 9/1998 | Hirai et al. ................. 700/173 |

FOREIGN PATENT DOCUMENTS

| | | |
|---|---|---|
| DE | 1677134 | 6/1971 |
| DE | 1477222 | 10/1973 |
| DE | 1502521 | 3/1974 |
| DE | 2261014 | 3/1976 |
| DE | 2904114 | 8/1980 |
| DE | 3342199 A1 | 5/1984 |
| DE | 3637128 A1 | 4/1988 |
| DE | 4119752 C2 | 1/1994 |
| DE | 3518902 C2 | 6/1994 |
| DE | 195 29 414 A1 | 9/1996 |

* cited by examiner

*Primary Examiner*—Ayaz Sheikh
*Assistant Examiner*—Frantz B. Jean
(74) *Attorney, Agent, or Firm*—Rockey, Milnamow & Katz, Ltd.

(57) ABSTRACT

A device and a method for distinguishing and automatically identifying and classifying tools using the device are disclosed. The device has a fixed reading unit attached to a machine tool and a coding system on a rotating tool. The coding system is a series of coding elements which are arranged on the rotating tool in the circumferential direction having a prescribed pitch spacing at different circumferential distances from one another, and which are successively sensed by the reading unit during rotation of the tool.

6 Claims, 3 Drawing Sheets

METHOD AND DEVICE FOR DISTINGUISHING AND AUTOMATICALLY IDENTIFYING AND CLASSIFYING TOOLS

CROSS-REFERENCE TO RELATED APPLICATIONS

This application claims the benefit of priority under 35 U.S.C. Sec. 119 from German patent application Ser. No. 19722121.1, filed on May 27, 1997.

FIELD OF THE INVENTION

The invention relates to a device and a method for distinguishing and automatically identifying and classifying tools.

BACKGROUND OF THE INVENTION

When a workpiece is being processed in machine tools, for example by grinding, the tools, for example the grinding wheels, which are used in the machine tool, are matched to the respective processing step. In addition, the tools are often subject to extremely rapid wear. The frequent changing of the tool which is necessitated by these two factors is alleviated by rapid-change systems which may be equipped with a magnetic tool attaching means (DE 22 61 014 C3, DE 33 42 199 A1).

The machine tool can thus be provided with the correct tool very quickly. However, a numerically controlled machine tool must also "know" which tool it is equipped with and what properties this tool has. For this reason, it has been necessary hitherto to enter manually a tool number and input the tool properties, for example the permitted stepping speed or the wear limit, which is not only relatively time-consuming but also constitutes a considerable source of errors.

In other fields, a very wide variety of automatic identification systems are already in use, for example the widespread bar code labels with the associated bar code readers which operate according to the optical principle, or the transponders which are activated in an inductive, contactless fashion and read out.

However, in the field of machine tools such identification systems have not acquired any practical significance. Opticals systems are generally susceptible to contamination, and the use of transponders, that is to say of complicated and expensive components, makes little sense in wearing parts such as tools. Moreover, the application of such coding aids frequently leads to an unacceptably high unbalance of the rapidly rotating tool. However, for reasons of cost, balancing of the tool is to e avoided.

DE 35 18 902 describes a device for identifying grinding wheels in which the grinding-wheel mounting flange on which the grinding wheel is attached has a code in the form of concentric grooves. A reading device can be applied to the end side of the grinding-wheel mounting flange with the grooves, which reading device comprises a number of mechanical microswitches which are arranged at intervals in the radial direction and which detect the presence or absence, as well as the depth, of the coding grooves.

This arrangement has the disadvantage that the grooves in the mounting flange have to be produced very precisely, which is costly. In addition, the cutting of grooves requires a relatively large volume from which material can be removed. During the manufacture of wearing parts, this leads to unacceptable increases in costs. Also, this system, like optical systems, is sensitive to contaminations.

DE 36 37 128 A1 discloses a device for identifying rotating tools, such as drills, which has the features of the preambles of claims 1 and 9. However, complete evaluation of signals is possible here only if, in addition to the output signals of the reading unit, which contain information relating to the arrangement of the coding elements on the circumference of the tool, additional information is lade available, which defines a reference point on the tool in order to permit an unambiguous identification and classification of the tool. For this purpose, in an exemplary embodiment, an additional rotational-speed actual value signal transmitter is provided which senses the rotational speed of an engine shaft or gearbox shaft in order to drive the tool, so that information relating to the instantaneous position of the tool can be obtained during the procedure of reading the coding elements. This means that, in addition to the reading unit, a further sensor is necessary, whose incremental output signals are also included in the signal processing of the output signals emitted by the sensor of the reading unit.

BRIEF SUMMARY OF THE INVENTION

The invention is based on the object of providing a method and a device which make it possible to identify and classify unambiguously a rotating tool using only a single sensor.

This object is achieved according to the invention with a device according to patent claim 1, and a method according to patent claim 1.

Advantageous refinements of the invention are given in the subclaims.

By determining that coding element which represents the first sensed coding element of a pair of coding elements with the smallest interval, and by determining this coding element as a reference element, i.e. as a zero point for the following count, an unambiguous identification and classification of the tool is possible solely by skilfully evaluating the sensed signals without an additional sensor, such as an incremental rotational-speed sensor being necessary for this.

When the invention is applied in the case of a grinding wheel and a grinding machine, the coding consists, preferably, in a number of drilled holes which are applied to the circumference of the metallic base body of the grinding wheel. The drilled holes are arranged in the circumferential direction with a specific pitch spacing. For this purpose, the 360 degrees of the circumference may, for example, be divided into constant intervals and the presence or nonpresence of a drilled hole at a specific pitch point contains the information in binary form (for example 0=no drilled hole, 1=drilled hole). However, the information can also be expressed as a different distance between the drilled holes or in the number of successive drilled holes and the like. In all cases, a large number of combination possibilities, and thus a high information content, can be obtained with relatively few drilled holes (for example 6) which are distributed with relatively fine pitch spacing over the circumference. The large number of combinations is the result here of the distribution of the small number of drilled holes over the large number of possible pitch spacing positions.

The spindle of a machine tool, which is in any case controlled precisely, provides many possibilities in terms of the fineness and manner of pitch division.

From the large number of possible combinations, those which do not provide any unbalance or provide only a small degree of unbalance of the tool (below a prescribed limit value) can be selected. Even if only the combinations which lead to no imbalance, or only to a negligible degree of unbalance, are selected, the number of remaining possible combinations for coding the tool is still sufficient. If appropriate, the drilled holes can also be provided symmetrically with respect to the axis of rotation, that is to say the information can, for example, be provided on a semicircle and repeated on the second semicircle.

The number of drilled holes is advantageously constant. In this case, reading errors can be detected very easily when the rotational speed is known, because the completion of a full rotation can then be inferred from the passage of a prescribed period of time.

The presence of a drilled hole can, in the simplest case, be determined by means of a fixed, inductive proximity switch, which is attached to the machine tool (or to another machine such as a tool dressing device or a sharpening device) in the vicinity of the grinding wheel. Such proximity switches are very robust components which are of simple design and cheap. The reading procedure takes place while the tool is rotating and the drilled holes are moving past a proximity switch. The information is read off from the tool at the latest after one complete rotation of the tool. This reading off is carried out preferably during one relatively slow rotation of the tool before the work on the machine begins.

Instead of drilled holes, cams, grooves and inserts made of a non-ferromagnetic material on the circumference of the tool can also be sensed by the inductive proximity switch.

Instead of the inductive proximity switch, other sensors which operate optically, electrically or magnetically or electro-optically, etc. may be used as the reading unit. The reading unit merely has to be capable of sensing successively the markings on the tool as the tool moves past.

The distinguishing system according to the invention is advantageous particularly in the case of tools and machine tools with a rapid-change system, possibly with a magnetic mount, since the type of tool no longer has to be input manually into the machine. As a result, not only is the process of changing the tool speeded up but inputting errors are also avoided.

Overall, the device according to the invention is very simple in terms of production technology. No relatively large modifications are necessary of the tool and the reading unit is small and robust and can be attached to the machine tool without relatively large expenditure.

BRIEF DESCRIPTION OF THE DRAWING

An exemplary embodiment of the device according to the invention and operation according to a method in accordance with the invention are explained in more detail below with reference to the drawings, in which.

DETAILED DESCRIPTION OF THE INVENTION

Figure 1:
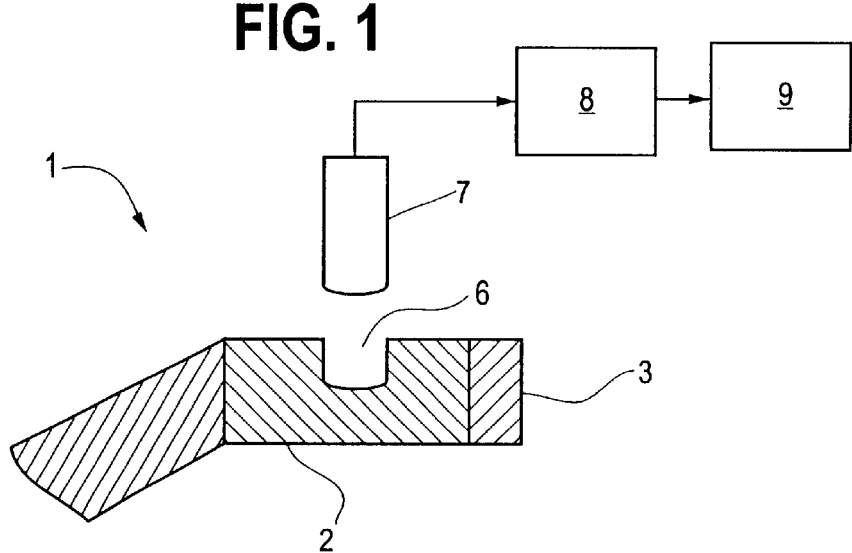
FIG. 1 shows a section through a cup wheel with a coding drilled hole and a sensor for sensing the drilled hole.

FIG. 1 of the drawing shows an enlarged view of a cup wheel 1 in section. The grinding wheel 1 is seated on a flange (shown only partially) with a hub (not shown) for attachment to a machine tool. The grinding wheel 1 is comprised of a base body 2 on whose end face a grinding coating 3 is applied. The base body 2 is comprised of a metallic, i.e. ferromagnetic, material, usually steel. The grinding wheel 1 constitutes a rotational body which during operation rotates about the axis of the tool which is located in the hub.

Figure 2:
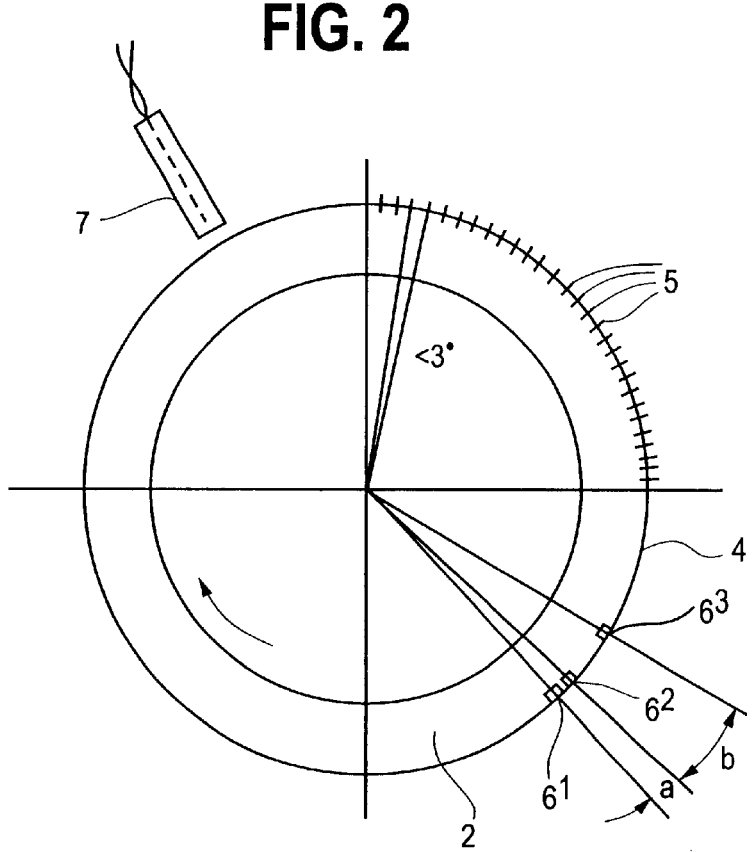
FIG. 2 shows a plan view of the base body of the cup wheel with the coding drilled holes on the circumference of the base body.

A circular pitch spacing system is provided on the base body 2, as shown in the view in FIG. 2. A base circle 4 of the pitch spacing system is located on the outer circumference of the base body 2. The individual pitch spacing points 5 of the pitch spacing system are formed by dividing the base circle 4 into identical is angular intervals of, for example, 3 degrees. The pitch spacing points 5 are, depending on the information to be recorded, provided with a blind hole 6, or not provided with one. The diameter of the drilled holes 6 is matched to the distances between the pitch spacing points 5. Since the pitch spacing is relatively fine, the drilled holes 6 also accordingly have only a relatively small diameter.

The division of the base circle 4 and the diameter of the drilled holes 6 are, of course, also matched to the resolution of the reading unit which is attached to the machine tool in order to sense the marks on the pitch spacing system.

of course, the base circle 4 constitutes only an ideal circle and the pitch spacing points 5 constitute only ideal points, and the said circle and said points are not implemented physically on the base body 2. Only the drilled holes 6 are actually implemented on the base body 2 and can be seen and sensed on the outer circumference of the finished tool.

Instead of the drilled holes 6, grooves may also be milled or ground into the base body 2 at the corresponding pitch spacing points 5. Alternatively, cams may also be provided on the base body 2 or generally distinguished, in the form of marks of such materials which differ from the base body in a property which the reading unit can sense.

The drilled holes 6 or, alternatively, the grooves or cams are distributed over the base circle in such a way that there is no resulting unbalance or an unbalance stays within prescribed limits. That is to say of the possible combinations of distribution of a specific number of drilled holes over the pitch spacing points for the information to be stored, only those combinations which fulfill this condition are selected.

In order to represent the information, a specific number of drilled holes, for example six, may be distributed over the pitch spacing points according to a previously determined coding scheme. The coding scheme can be based on a fixed or a variable number of drilled holes. A binary coding scheme (drilled hole present=1, no drilled hole present=0 or the like) may be applied or even one which is based on the distances between the drilled holes.

On the machine tool, an inductive proximity switch 7 is provided in a fixed position opposite the base circle 4 of the base body 2 as reading unit or sensor. The proximity switch 7 operates in a contactless fashion, that is to say it is kept at a distance from the base body 2.

When the grinding wheel 1 moves past the proximity switch 7, the proximity switch 7 senses the individual drilled holes 6 That is to say the signal from the proximity switch 7 indicates whether or not there is a drilled hole 6 at the individual pitch spacing points 5, and what distance there is between the individual drilled holes along the circumference of the grinding wheel 1. For this purpose, the grinding wheel 1 is preferably moved past the proximity switch 7 at a specific, low speed.

Connected to the sensor or proximity switch 7 is an electronic processing unit 8 which senses the signal of the sensor and conditions it to form an output signal which permits an unambiguous identification and classification of the grinding wheel in a downstream electronic control system 9 of the machine tool. The processing unit 8 can be provided separately or be a direct component of a correspondingly programmed control unit of the machine tool.

To enable the sensor or proximity switch 7 to register the signal, after a tool replacement the grinding wheel is thus turned slowly for one or a small number of rotations until the signal is unambiguously sensed. The coding here is preferably such that the starting point of the sensing operation can be selected as desired and can be detected by the system. Before the work with the tool is started, all the relevant parameters of the tool are thus transmitted to the machine tool without any variables whatsoever having to be input manually or automatically.

Figure 3:
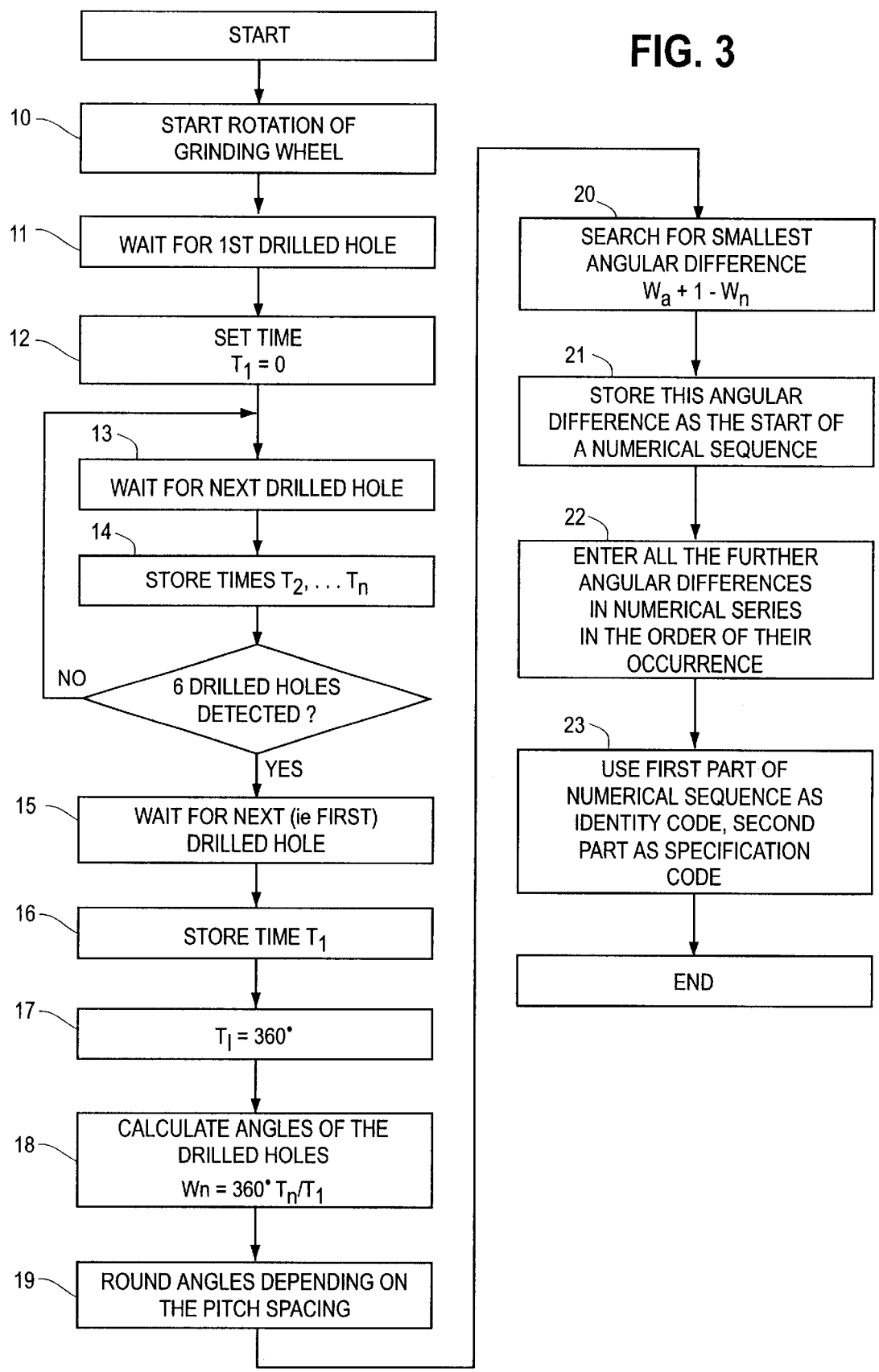
FIG. 3 shows a flowchart for processing the sensed coding data.

In FIG. 3, the procedure for identifying and classifying a grinding wheel is represented in the form of a flowchart. After the start, in a first step 10 a new grinding wheel is made to rotate at a low, constant speed before a grinding procedure is started, it being unnecessary to know the magnitude of this rotational speed, but it is advantageously kept lower than the operating rotational speed. In a step 11, the system waits until the first drilled hole of the drilled holes $6^1$ to $6^n$ is sensed by the reading unit. In step 12, a time $t_1=0$ to the time when this first drilled hole is sensed is set.

In step 13, the system waits until the following drilled hole is sensed by the reading unit 7, and so on. In step 14, the times $t_2, t_3 \ldots$ at which in each case a drilled hole has been sensed by the reading unit are stored. Then, in step 15 the system interrogates whether all the drilled holes, in the present case six drilled holes, have been detected. If this is not the case, the steps 13 and 14 are repeated again. If all the drilled holes have been detected, the system waits for the next drilled hole, that is to say it waits again for the first drilled hole to be sensed in step 11, and in step 16 the time $t_7$ when this drilled hole is sensed is stored, and in step 17 it is noted as the time of a complete rotation of the grinding wheel through 360°.

In step 18, the angle of the drilled holes is calculated in the processing unit 8 in accordance with the relationship $W^n=360° \, t_n/t_7$. In step 19, the calculated angles, which may be subject to inaccuracies, are rounded on the pitch spacing on which the drilled holes are also located and which can have an angular division of steps of, for example, 2°.

In step 20, a search is made for the smallest angular difference $a=W_{n+1}-W_n$, which in the exemplary embodiment according to FIG. 2 for example, may be assumed to be between the drilled holes $6^1$ and $6^2$.

This smallest angular difference is stored as the start of a numerical sequence in step 21. In the following step 22, all the further angular differences are entered into the numerical sequence in the order of their occurrence.

Finally, in step 23 the first part of this numerical sequence is used as an identity code, while the second part is used as a specifications code.

In the embodiment described, drilled holes $6^1, 6^2, \ldots 6^n$ are provided in the circumferential edge of the cup wheel 1 as coding elements, as already described, in which case six drilled holes in total are advantageously provided over the circumference at different angular intervals from one another. In order to clarify the relations, it will be assumed, by way of example, that in the case of a grinding wheel with a diameter of 400 mm, the dimensions of the drilled holes are in each case a diameter of 5 mm and a depth of 2 mm. These drilled holes are, as stated above, all arranged on a pitch spacing with an angular division of, for example, 2° or any desired multiple thereof.

When the drilled holes are being fabricated, it is necessary to avoid an unacceptable unbalance of the grinding wheel being produced. The weight quality which is necessary for this is specified by VDI guideline 2060 with the value Q1. General information on determining the unbalance including formulas are also presented in this guideline.

Figure 4:
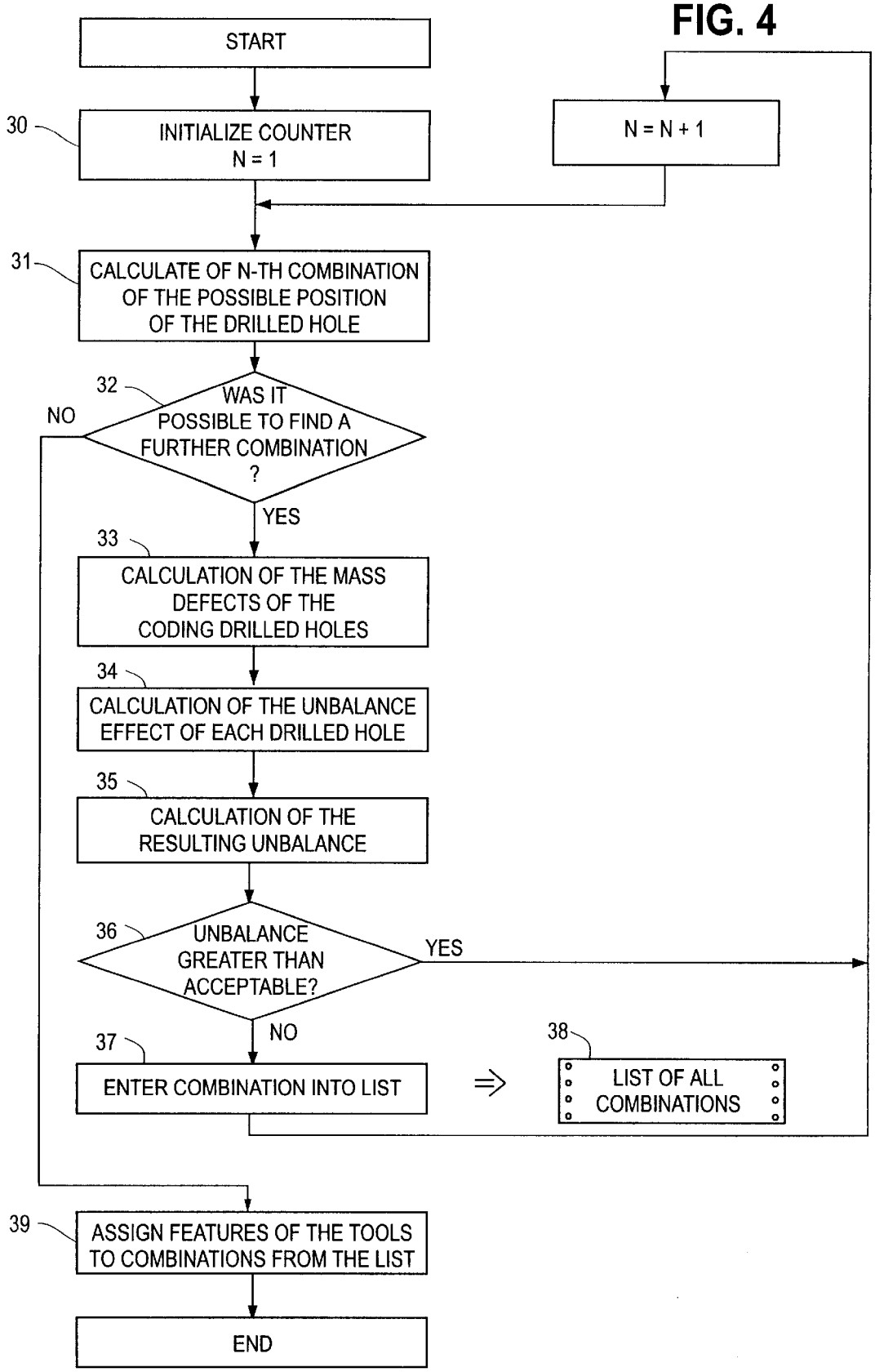
FIG. 4 shows a flowchart for determining a virtually unbalance-free arrangement of the coding elements on the cup wheel.

FIG. 4 specifies an iterative, numerical method in the form of a flowchart which enables the drilled holes to be correctly placed on the grinding wheel 1 on a prescribed pitch spacing.

Firstly, a counter is initialized in a step 30. Then, in a step 31, the first of n combinations of the possible position of the drilled holes is calculated. In a step 32 the system interrogates whether it has been possible to find a further combination. If this is the case, in step 33 the mass defects of the individual drilled holes are calculated, and in step 34 the unbalance influences of each drilled hole, and in step 35 the resulting unbalances are calculated. If it is determined in the interrogation 36 that the unbalance is greater than is acceptable, after the cycle number n has been increased to n+1 the system jumps back to a point on the programme before step 31, and the steps 31 to 36 are repeated, specifically until it is determined in the interrogation according to step 36 that the unbalance is no longer unacceptably large. Then, in accordance with step 37, the acceptable combination which has been found is entered into a list 38, and, after the cycle number has been increased, the system jumps back into the programme before block 31, until finally it is determined in the interrogation 32 that it has not been possible to find a further combination. After the combinations from the previously completed list 38 have been assigned with respect to features of the tools in step 39, the computational procedure is terminated.

With the calculation according to FIG. 4 it is possible to calculate iteratively the position of the centre of gravity of the grinding wheel, provided with the drilled holes $6^1, 6^2, \ldots 6^n$, for any conceivable combination of positions of the drilled holes. Those combinations which do not lead to the acceptable unbalance being exceeded are determined and entered into the list 38. After the calculation has been concluded, features of the grinding wheels can be assigned to any acceptable combination.

In the embodiment shown in FIGS. 1 and 2, the base circle 4 for the pitch spacing points 5 lies on the outer circumference of the base body 2 of the grinding wheel 1, and the central axes of the drilled holes 6 run in the radial direction perpendicularly to the axis of rotation of the grinding wheel 1. However, the base circle for the pitch spacing of the drilled holes may also lie on the flange of the grinding wheel 1, the central axis of the drilled holes 6 then no longer running perpendicularly to the axis of rotation of the grinding wheel 1.

The coding according to the invention can, of course, also be used in grinding wheels which are shaped differently than in the way shown. In the case of grinding wheels which, for example, have a flange which extends in a plane perpendicular to the axis of rotation and in which the grinding covering is applied directly to the flange, the base circle for the pitch spacing may lie on the outer circumference of the flange or even on the, possibly, free underside or upper side of the flange. In the latter case, the drilled holes then lie on a circle about the axis of rotation, and the central axes of the drilled holes extend in the axial direction parallel to the axis of rotation.

Finally, the coding according to the invention can also be provided generally on any rotating tool, not only on grinding wheels, but also, for example, on drills, milling devices etc.

What is claimed is:

1. A method for distinguishing and automatically classifying rotating tools comprising the steps of:
   a) rotating a rotating tool having more than two coding elements, before its first use, through such an angle that all coding elements are moved past a reading unit;
      wherein said coding elements are arranged one after another in the circumferential direction, at a prescribed radial distance from the axis of said rotating tool, wherein said coding elements have equal dimensions in circumferential directions, and wherein said coding elements are arranged with a prescribed pitch spacing at different circumferential distances from one another;
   b) sensing said coding elements by said reading unit;
   c) producing said output signals from the sensing of step b);
   d) feeding said output signals to a processing unit; and then
   e) selecting the pair of coding elements with the smallest circumferential interval;
   wherein, from said selected pair of coding elements, the coding elements which moves past said reading unit during rotation of said rotating unit is the reference coding element.

2. The method of claim 1 wherein said processing unit is supplied exclusively with said output data of said reading unit as input data.

3. The method of claim 1 wherein said coding elements are distributed about the circumference of said rotating tool so that no unacceptable unbalance is produced.

4. The method of claim 1 further comprising rotating said rotating tool through at least one rotation at a lower rotational speed than during step a)
   wherein distances between all the coding elements in the circumferential direction are determined numerically in the form of differential angles and the smallest angular difference is searched for,
   and wherein the coding element which marks the start of this smallest angular difference is set as the starting point for the start of a numerical sequence with the following angular differences, and all the further angular differences are entered in the sequence of each occurrence in a list.

5. The method of claim 4 wherein said differential angles are rounded with adjustment to the pitch spacing.

6. The method of claim 1 wherein said rotating tool is a grinding wheel.

* * * * *